United States Patent
Kwon et al.

(10) Patent No.: US 9,877,262 B2
(45) Date of Patent: Jan. 23, 2018

(54) APPARATUS AND METHOD FOR TRANSMITTING AND RECEIVING DATA IN WIRELESS COMMUNICATION SYSTEM

(71) Applicant: ELECTRONICS AND TELECOMMUNICATIONS RESEARCH INSTITUTE, Daejeon (KR)

(72) Inventors: Hyoung Jin Kwon, Daejeon (KR); Jin Kyeong Kim, Daejeon (KR); Woo Yong Lee, Daejeon (KR); Yong Sun Kim, Daejeon (KR); Kyeongpyo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/821,854

(22) Filed: Aug. 10, 2015

(65) Prior Publication Data

US 2015/0351001 A1 Dec. 3, 2015

Related U.S. Application Data

(63) Continuation of application No. 14/329,623, filed on Jul. 11, 2014, now Pat. No. 9,113,407, which is a
(Continued)

(30) Foreign Application Priority Data

Dec. 5, 2007 (KR) .......................... 10-2007-0125697
May 6, 2008 (KR) .......................... 10-2008-0041976

(51) Int. Cl.
*H04W 12/00* (2009.01)
*H04W 40/22* (2009.01)
(Continued)

(52) U.S. Cl.
CPC .......... *H04W 40/22* (2013.01); *H04B 7/2606* (2013.01); *H04L 45/00* (2013.01); *H04L 45/22* (2013.01); *H04W 40/02* (2013.01)

(58) Field of Classification Search
CPC ..................................................... H04W 40/22
See application file for complete search history.

(56) References Cited

U.S. PATENT DOCUMENTS 6,665,521 B1    12/2003  Gorday et al.
2003/0125067 A1  7/2003  Takeda et al.
(Continued)

FOREIGN PATENT DOCUMENTS

JP    2004-179909 A    6/2004
JP    2006-050377 A    2/2006
(Continued)

OTHER PUBLICATIONS

"Cooperative Communication in Wireless Networks", Nosratinia, A. et al., IEEE Communications Magazine, Oct. 2004, pp. 74-80.
(Continued)

*Primary Examiner* — John Blanton
(74) *Attorney, Agent, or Firm* — Rabin & Berdo, P.C.

(57) ABSTRACT

Methods for transmitting and receiving data of a station includes setting a direct route to a corresponding station and a relay route to a relay device, selecting one route as between the direct route and relay route, and transmitting and receiving data through the selected route. A non-transitory computer-readable storage medium may store a program including instructions to cause a computer to perform the method. The setting may be performed by a processor and the transmitting and receiving may be performed respectively by a transmitter and a receiver.

5 Claims, 12 Drawing Sheets

Related U.S. Application Data continuation of application No. 12/746,514, filed as application No. PCT/KR2008/007177 on Dec. 4, 2008, now Pat. No. 8,797,848.

(51) Int. Cl.
  *H04B 7/26* (2006.01)
  *H04L 12/701* (2013.01)
  *H04L 12/707* (2013.01)
  *H04W 40/02* (2009.01)

(56) References Cited

U.S. PATENT DOCUMENTS

| | | | |
|---|---|---|---|
| 2004/0090935 A1* | 5/2004 | Courtney | H04W 36/12 370/331 |
| 2004/0218548 A1* | 11/2004 | Kennedy | H04L 1/1685 370/254 |
| 2005/0232183 A1 | 10/2005 | Sartori et al. | |
| 2005/0232227 A1* | 10/2005 | Jorgenson | H04L 41/14 370/351 |
| 2006/0250964 A1 | 11/2006 | Vasseur et al. | |
| 2006/0285505 A1* | 12/2006 | Cho | H04L 45/00 370/254 |
| 2008/0014892 A1 | 1/2008 | Aldana | |
| 2008/0039046 A1 | 2/2008 | Vilzmann et al. | |
| 2008/0101364 A1* | 5/2008 | Chow | H04J 3/085 370/390 |
| 2008/0112325 A1 | 5/2008 | Sivakumar et al. | |
| 2008/0159311 A1 | 7/2008 | Martinotti et al. | |
| 2008/0207205 A1* | 8/2008 | Kim | H04W 36/14 455/436 |
| 2009/0129323 A1 | 5/2009 | Chen et al. | |
| 2009/0143008 A1 | 6/2009 | Hottinen et al. | |
| 2010/0195644 A1 | 8/2010 | Hao | |
| 2010/0238853 A1* | 9/2010 | Zhou | H04L 45/12 370/315 |
| 2010/0254306 A1* | 10/2010 | Kitaji | H04M 7/006 370/328 |

FOREIGN PATENT DOCUMENTS

| | | |
|---|---|---|
| JP | 2006-060704 A | 3/2006 |
| KR | 2002-0089094 A | 11/2002 |
| KR | 2005-0101693 A | 10/2005 |
| KR | 2006-0111238 A | 10/2006 |
| WO | WO-2006/089568 A1 | 8/2006 |

OTHER PUBLICATIONS

"Grouping and Partner Selection in Cooperative Wireless Networks", Aria Nosratinia et al., IEEE Journal on Select Areas in Communications, vol. 25, No. 2, Feb. 2007, pp. 369-378.

* cited by examiner

FIG. 5

Table 64 - MAC Capability Bitmap

| Octet | Bit | Attribute | Description |
|---|---|---|---|
| 0 | 0 | PCA | Capable of transmitting and receiving frame using the PCA mechanism |
| | 1 | Hard DRP | Capable of being the owner and target of Hard DRP reservations |
| | 2 | Soft DRP | Capable of being the owner and target of Soft DRP reservations |
| | 3 | Block ACK | Capable of transmitting and acknowledging frames using the B-ACK mechanism |
| | 4 | Explicit DRP negotiation | Capable of negotiating a DRP reservation using command frame |
| | 5 | Hibernation anchor | Capable of acting as a hibernation anchor |
| | 6 | Probe | Capable of responding to Probe IEs received in command frame |
| | 7 | Link feedback | Capable of generating and Interpreting a Link Feedback IE |
| 1 | 0 | Range measurement | Capable of initiating and participating in range measurement calculations |
| | 1-7 | Reserved | Reserved |

| Octet | Bit | Attribute | Description |
|---|---|---|---|
| 1 | 1 | Relay Capability | Capable of relaying of Type A device |
| | 2 | Relay Support Capability | Capable of supporting a relay link |

FIG. 6

| Octets:1 | 1 | 1 | 2 | 2 | 1 | 1 | 1 |
|---|---|---|---|---|---|---|---|
| lement ID | Length | Relay Command Type | Relay Address | DETOUR Start Duration | NO ACK Received | Relay Control | Relay Mode |

FIG. 7

Relay command type

| Value | Relay Command Type |
|---|---|
| 0 | Relay Set Request |
| 1 | Relay Set Reponse |
| 2 | Relay Complete Request |
| 3 | Relay Complete Reponse |
| 4 | Relay Switch Request |
| 5 | Relay Switch Reponse |
| 6 | Reserved |

FIG. 8

Relay mode type

| b7-b5 | b4-b1 | b0 |
|---|---|---|
| Reserved | Link Order | Relay Mode |

FIG. 9

| Value | Link order |
|---|---|
| 0000 | 0-1 |
| 0001 | 0-2 |
| 0010 | 0-1-2 |
| 0011 | 0-2-1 |
| 0100-1111 | reserved |

APPARATUS AND METHOD FOR TRANSMITTING AND RECEIVING DATA IN WIRELESS COMMUNICATION SYSTEM

The present application is a Continuation Application of co-pending U.S. application Ser. No. 14/329,623, filed on Jul. 11, 2014, which is a Continuation Application of U.S. application Ser. No. 12/746,514 (now U.S. Pat. No. 8,797,848), filed on Jun. 4, 2010, which is the national stage application of PCT/KOR2008/007177, filed on Dec. 4, 2008, and claims the benefit of Korean Patent Applications No. 10-2007-0125697, filed on Dec. 5, 2007 and No. 10-2008-0041976, filed on May 6, 2008, the subject matter of which is herein incorporated by reference.

TECHNICAL FIELD

The present invention relates to an apparatus and method for transmitting and receiving data in a wireless communication system, and particularly, to an apparatus and method for transmitting and receiving data using multiple routes.

This work was supported by the IT R&D program of MIC/IITA. [2007-S-002-01, Development of Multi-Gigabit Wireless Interface Technologies]

BACKGROUND ART

In a wireless system, when a channel of a route that is in use is interrupted by a person, obstacle, and the like, a condition of the channel becomes extremely deteriorated, and thus a communication is often disconnected. In this case, since the person or obstacle may not permanently exist but moves, the communication interruption may disappear. However, in a wireless communication system in a 60 GHz band, data is exchanged at high speed, as fast as 3 Gbps. Therefore, although the time of the communication interruption is very short, serious problems may occur. Accordingly, a method of transmitting/receiving data through a multi-route using an Acknowledge (ACK) signal for each route is suggested. The method verifies whether the route is interrupted based on the ACK signal for each route and uses other routes. Therefore, the method has a weak point that information about the route that is in use is required to be inserted in a Media Access Control (MAC) header in every data frame. Also, although a load of the inserted information is not heavy, power consumption for switching a beam every time when transmitting a data packet to another route may be a burden for a device that is designed to be operational with a low power.

Accordingly, a data transmitting/receiving apparatus and method which reduces a power consumption as much as possible, and which uses the multiple routes to smoothly exchange data without interruption even though there exists a person or obstacle in the wireless communication, is required.

DISCLOSURE OF INVENTION

Technical Goals

An aspect of the present invention provides an apparatus and method for transmitting/receiving data in a wireless communication system, which can smoothly communicate, even though the direct route is interrupted, through an alternative route using a relay device in addition to a direct route.

Another aspect of the present invention also provides an apparatus and method for transmitting/receiving data in a wireless communication system, which can smoothly communication delay sensitive information such as video streaming, even though the direct route is interrupted, through sequentially using a direct route and alternative routes between stations.

Technical Solutions

According to an aspect of an example embodiment, there is provided a station including a route setting unit to respectively set a communication route to a corresponding station and a communication route to a relay device, a route verifying unit to verify whether the set communication routes are available, a route selecting unit to select one route from among communication routes according to a result of the verification of the availability, and a data transceiver to exchange data through the selected communication route.

According to another aspect of an example embodiment, there is provided a method for transmitting/receiving data of a station including respectively setting a direct route to a corresponding station and a relay route to a relay device, selecting one route from among the direct route and relay route, and transmitting/receiving data through the selected route.

According to another aspect of an example embodiment, there is provided a method of transmitting/receiving data of a relay device including respectively setting a communication route to a single station and a communication route to a corresponding station that intends to communicate with the station, and receiving the data from the single station and transferring the data to the corresponding station.

BRIEF DESCRIPTION OF DRAWINGS

FIG. 5 illustrates a bitmap format of a Media Access Control (MAC) capability information element (IE);

FIGS. 6 to 9 illustrate a bitmap format of a Relay information element (IE);

BEST MODE FOR CARRYING OUT THE INVENTION

Figure 1:
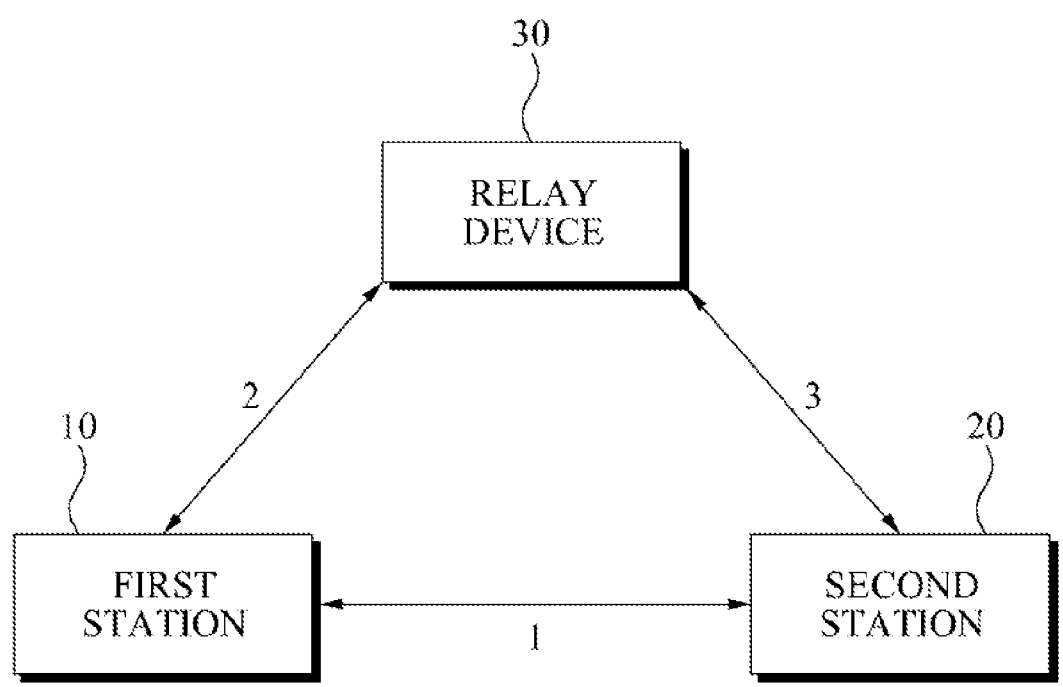
FIG. 1 is a block diagram illustrating a data transceiver in a wireless communication system according to an example embodiment.

Although a few example embodiments of the present invention have been shown and described, the present invention is not limited to the described example embodiments, wherein like reference numerals refer to the like elements throughout.

Hereinafter, an apparatus and method for transmitting/receiving data in a wireless communication system according to the present invention will be described in detail referring to attached drawings.

A basic concept of the present invention is to enable stations to smoothly communicate, even though the direct route is interrupted, through an alternative route using a relay device in addition to a direct route.

A data transmitting/receiving method in a wireless communication system according to example embodiment may be applicable to a WiMedia, and is not limited thereto. The WiMdia, a compound word of a Wireless and a Media, is a wireless technology that eliminates a connection cable in a home networking, and enables super high-speed data transmission between electric home appliances such as a PDA, MP3 player, digital TV, HDTV, DVD player, digital camcorder, digital set-top box, game console, and the like.

A WiMedia Media Access Control (MAC) includes two MAC formats that are a Distributed Reservation Protocol (DRP) and Priority Contention Access (PCA). The DRP, which is a similar to a Time Division Multiple Access (TDMA), reserves data transmission time in advance and transmits the data at the reserved time. That is, according to DRP, each device exchanges a beacon in a Beacon Period (BP) and establishes a beacon group or extended beacon group, thereby enabling contention-free reservation data communication in the group. The PCA, which is similar to Enhanced Distributed Channel Access (EDCA) of IEEE 802.11e, performs data transmission using a different back-off according to each priority.

Figure 2:
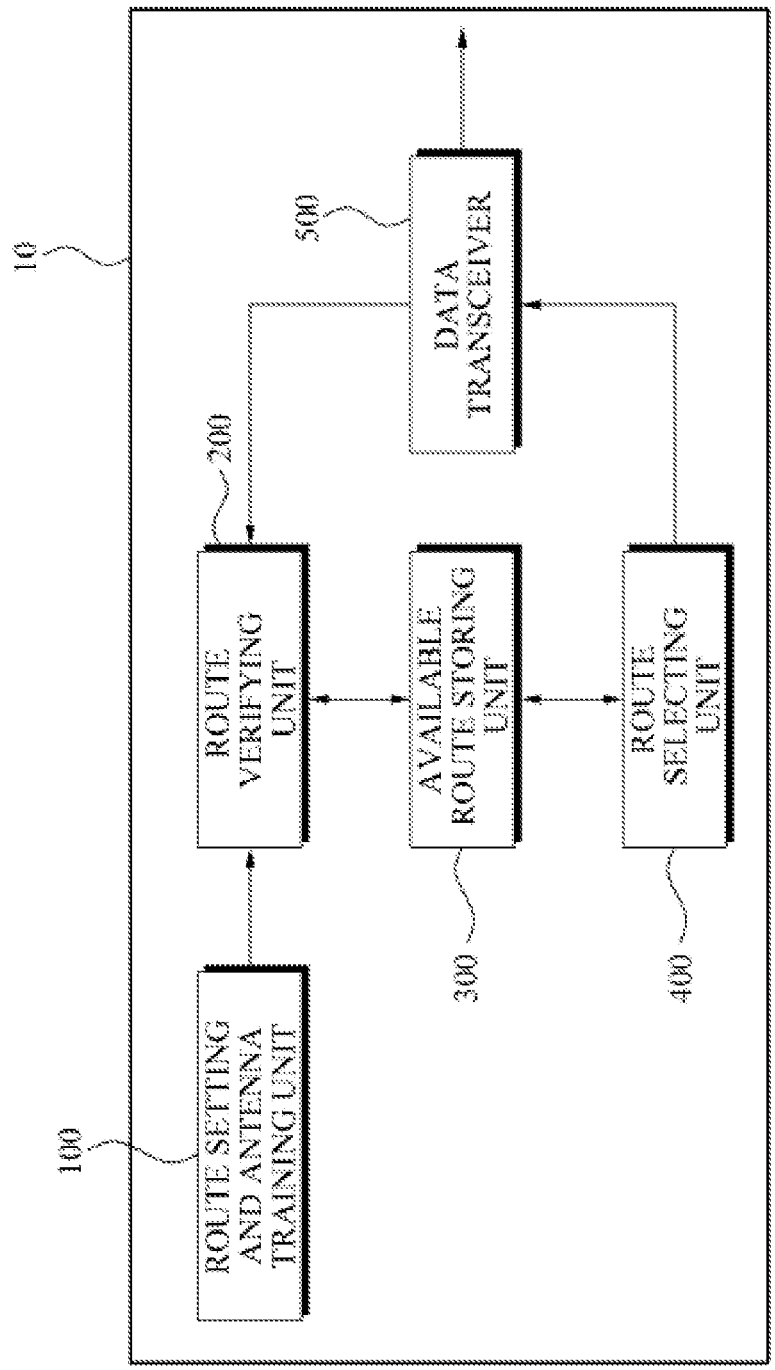
FIG. 2 is a block diagram illustrating a configuration of a station of FIG. 1.

FIG. 1 is a block diagram illustrating a data transceiver in a wireless communication system according to an example embodiment and FIG. 2 is a block diagram illustrating a configuration of a station of FIG. 1.

Referring to FIG. 1, the data transceiver in the wireless communication system according to an example embodiment includes a first station 10, second station 20 and a relay device 30.

The wireless communication system according to an example embodiment uses a band at 60 GHZ or 1 THz and the first station 10 and second station 20 are in a Line of Sight (LOS).

The first station 10 and second station 20 may communicate using a direct route A established in the LOS. Also, each of the stations 10 and 20 supports relaying.

Referring to FIG. 2, the first station 10 includes a route setting and antenna training unit 100, route verifying unit 200, available route storing unit 300, route selecting unit 400 and data transceiver 500.

The route setting and antenna training unit 100 sets a direct route 1 and relay route 2 between the second station 20 and relay device 30, and performs antenna training. Here, the station 20 is a corresponding station that intends to communicate with the first station 10.

The route verifying unit 200 verifies whether the direct route 1 and relay route 2 are available, the direct route 1 and the relay route 2 being established by the route setting and antenna training unit 100. The route verifying unit 200 stores an available route to the available route storing unit 300. Route data of the available route storing unit 300 is updated according to wireless environment.

The route selecting unit 400 is provided with available routes from the available route storing unit 300 and selects one from among the available routes. The route selecting unit 400 may preferably select the direct route 1 to the second station 20 and, when the direct route is interrupted, may select the relay route 2 to the relay device 30. However, the route selecting unit 400 is not limited thereto, and when both of the direct route 1 and relay route 2 are available, the route selecting unit 400 may alternately select two routes according to an order of use.

The data transceiver 500 transmits/receives data to/from the second station 20 or relay device 30 through the selected route. In this instance, the data transmitted to the relay device 30 is transferred to the second station 20 again.

A super frame transmitted/received from the stations 10 and 20 is composed of a plurality of media access slots and includes a Beacon Period (BP) and Data Transfer Period (DTP). The BP is divided into beacon slots and transferred. Here, a beacon performs adjusting of a synchronization of a network and the DTP transmits data according to the DRP and PCA.

Each of the stations 10 and 20 use a sector antenna or array antenna to support a forward transmission. This may be to establish the beacon group, a basis of the DRP of the WiMedia MAC through supporting the forward transmission of the beacon, and to enable a contention-free communication between beacon groups. However, when each of the stations 10 and 20 transmits data excluding the beacon, the transmission is performed in a specific direction that is not a forward direction.

The relay device 30 is a device to provide an additional route with respect to the first station 10 and second station 20. The additional route indicates an alternative route enabling data communication between the first station 10 and second station 20 in addition to the direct route 1 that is established in the LOS of the first station 10 and second station 20. Specifically, the alternative route includes a first relay route between the first station 10 and relay device 30 and a second relay route 3 between the second station 20 and relay device 30. Here, the alternative route and the direct route 1 are set not to conflict with each other.

When receiving the BP, two RF chains of relay device 30 perform in a reception mode. The relay device 30 receives a beacon and transmits the received beacon to stations 10 and 20. Conversely, when receiving the DTP, if the relay device 30 does not perform a relay operation, two RF chains of the relay device 30 perform in a reception mode. However, when the relay operation is performed, the two RF chains of the relay device 30 are respectively switched to perform in a reception mode and a transmission mode depending on transmission direction of data.

Figure 3:
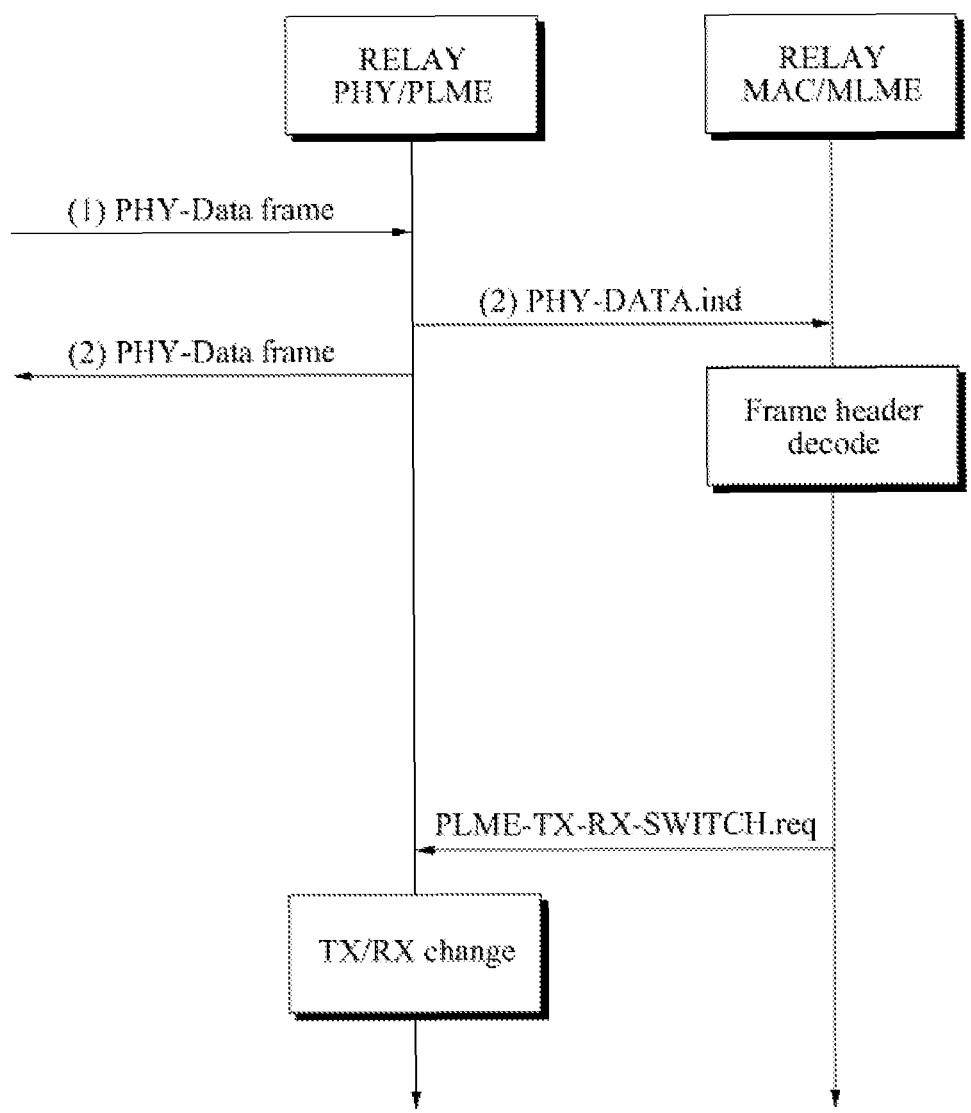
FIG. 3 illustrates a message chart with respect to an internal operation of a relay device of FIG. 1.

Specifically, when performing a relay operation, the relay device 30 transfers data in an amplify-and-forward scheme as illustrated in FIG. 3, simultaneously decodes a packet header to check which ACK policy is used, and performs switching of a mode of the RF Chains depending on the check result. Here, ACK policy may be one of a No-ACK, Immediate ACK, and Block ACK.

Specifically, when a field of the ACK policy of the decoded packet header is the No-ACK, the relay device 30 maintains a tx and rx mode of the two RF Chains. When the ACK policy field of the decoded packet header is the Immediate ACK, the relay device 30 switches both of the two RF Chains. That is, the relay device 30 switches a RF Chain in the tx mode into the rx mode and a RF Chain in the rx mode into the tx mode. In this instance, the relay device 30 performs switching after completing transmission of the packet that is presently being relayed. Also, when the ACK policy field of the decoded packet header is the block ACK, the relay device 30 switches the mode of the two RF Chains according to a transmission time of an ACK included in the decoded packet header.

A data transceiver using the relay device 30 in the wireless communication system according to the present invention enables smooth data communication between stations through the alternative route by using the relay device 30 even when a direct route 1 is interrupted by a person or obstacle.

Figure 4:
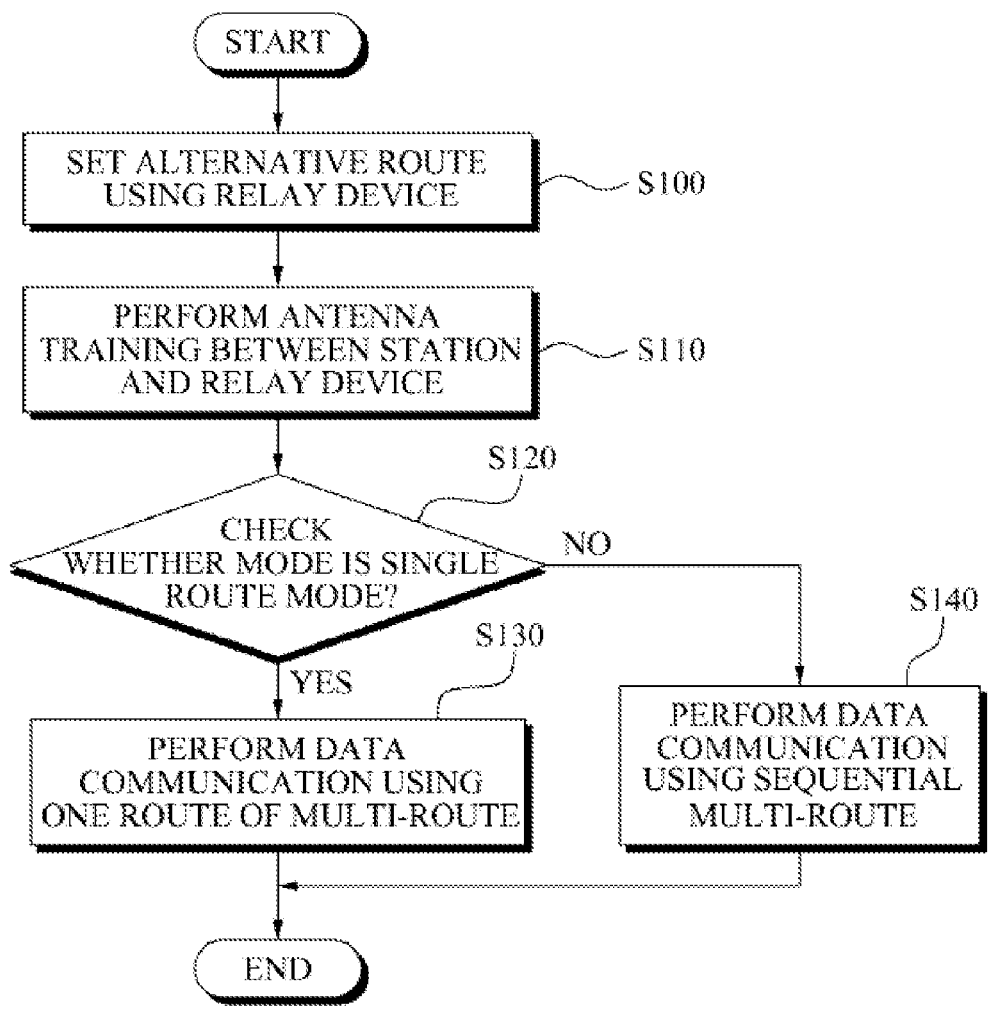
FIG. 4 is a flowchart illustrating a data transmitting/receiving method in a wireless communication system according to an example embodiment.

FIG. 4 is a flowchart illustrating a data transmitting/receiving method in a wireless communication system according to an example embodiment. FIG. 5 illustrates a bitmap format of an MAC capability information element (IE).

Referring to FIG. 4, first, a station sets an alternative route using a relay device in operation S100.

According to an aspect of the present invention, the station and a corresponding station may communicate through a direct route located in a LOS. Also, each station may use at least one relay route according to a type of the station and a type of an antenna included in the station. Accordingly, each station sets a relay support capability field to 1 to use the relay route, the relay support capability field being newly defined in the MAC capability IE. Subsequently, the station includes the MAC capability IE, wherein the relay support capability field sets to 1, in a beacon or DTP and transmits.

Referring to FIG. 5, the bitmap format of the MAC capability IE defines a Priority Contention Access (PCA), Distributed Reservation Protocol (DRP), explicit, relay, and the like.

Here, one bit of Octet 1 represents a relay capability field and two bits of Octet 1 represent a relay support capability field. The relay capability filed indicates whether a relay device perform a relay operation. Also, the relay support capability field indicates whether the station supports data exchange using the relay route.

The relay device receives a beacon of other stations before transmitting a frame. Subsequently, when the relay device receives at least one beacon during scanning a signal, the relay device transmits the beacon from an empty slot using a forward beam according to a beacon transmission procedure described in a wireless MAC. In this instance, the relay device transmits MAC capability IE after setting the relay capability field of the MAC capability IE to 1.

Therefore, according to an aspect of the present invention, when the station and corresponding station want to communicate using the relay device, the setting of the alternative route includes verifying whether the relay device exists and notifying that the station and corresponding station want to communicate data using the relay device to each station and relay device, thereby combining each station. The alternative setting procedure is possible through that the station and corresponding station transmit a beacon including the relay support capability filed that is set to 1 and then the relay device that receives the beacon transmits the beacon including the relay capability filed that is set to 1.

Subsequently, the station performs antenna training with the relay device in operation S110.

The relay device respectively performs antenna training with station and corresponding station that want to communicate. Here, in the case of when a directional antenna is equipped, the antenna training is a procedure to adjust a direction of a beam of the directional antenna and reduce a width of the beam in order to transmit farther or increase throughput.

Subsequently, the alternative route wherein the antenna training is completed is added to an available route list and managed.

Subsequently, the station checks a mode of a communication route in operation S120.

The communication route between the station and corresponding station according to an aspect of the present invention may include a single route mode and sequential multi-route mode. Here, the single route is a mode wherein data is transmitted/received using one route from the multi-route between the stations. The sequential multi-route mode is a mode wherein data is transmitted/received through sequentially using the multi-route between the stations. Here, the multi-route may include an alternative route using the direct route located in the LOS between the stations and relay device.

Subsequently, when the communication route mode is the single route mode, the station transmits/receives data using one route from the multi-route in operation S130.

Specifically, the station transmits/receives data using one route among the direct route and alternative route. In this instance, the station may continuously transmit/receive data using the selected route until the one selected route is interrupted. Subsequently, when the direct route is available, the station may communicate through the direct route again.

For example, the station preferably transmits/receives data using the direct route. In this instance, the direct route may be temporarily or permanently interrupted by a person, obstacle, and the like. Then, the station may transmit/receive the data using the alternative route. Subsequently, when the direct route becomes available, the station may communicate through the direct route again.

A route switching method of the station according to interruption of the communication route may include an explicit method that uses a relay switch command and an implicit method that uses a time of the interruption. The route switching method will be described in detail referring to FIG. 11 and FIG. 12.

Subsequently, when the communication route mode is the sequential multi-mode, the station transmits/receives data using all of the multi-route in operation S140.

Specifically, the station may determine an order of the direct route and relay route and transmit/receive data using the direct route or relay route according to the determined order. However, when one of the two routes is interrupted, the station may transmit/receive data using merely one available route. Subsequently, when the interrupted route becomes available, the station may communicate using the multi-route according to the order.

For example, first, the station may transmit/receive data using the direct route, and then transmit/receive data using the alternative route. Then, the station may communicate through alternately using the direct route and the alternative route. However, when the direct route is interrupted, the station communicates merely using the alternative route. Subsequently, when the direct route becomes available, the station may sequentially use the direct route and alternative route to communicate.

When performing the communication, the direct route and alternative route may be managed as the available route list according to availability. The available route list may be updated according to periodical verification of the availability.

Hereinafter, a bitmap format of a Relay IE and a procedure of antenna training between the station and relay device will be described in detail.

FIGS. 6 to 9 illustrate a bitmap format of a Relay IE.

Referring to FIG. 6, the Relay IE defines a Relay command type, Relay mode, and the like.

The Relay IE may request a command to perform a relay operation such as relay set, relay complete, relay switch and be used in response to the request. Specifically, bit information for each Relay command type is as illustrated in FIG. 7 and bit information for each Relay mode type is as illustrated in FIG. 8.

Referring to FIG. 8, the Relay mode type includes a tx mode field and link order field.

The tx mode indicates a communication route mode of a station. For example, when the tx mode field is 0, it indicates a single route mode, and when the tx mode field is 1, it indicates a sequential multi-route mode.

The link order field indicates a route and an order of the route, which is as illustrated in FIG. 9.

Referring to FIG. 9, the link order field may be defined according to the route and the order of the route. Here, 0 indicates a direct route and 1 indicates a first alternative route. Also, 2 indicates a second alternative route. Here, although two alternative routes are described, the present invention is not limited thereto.

Figure 10:
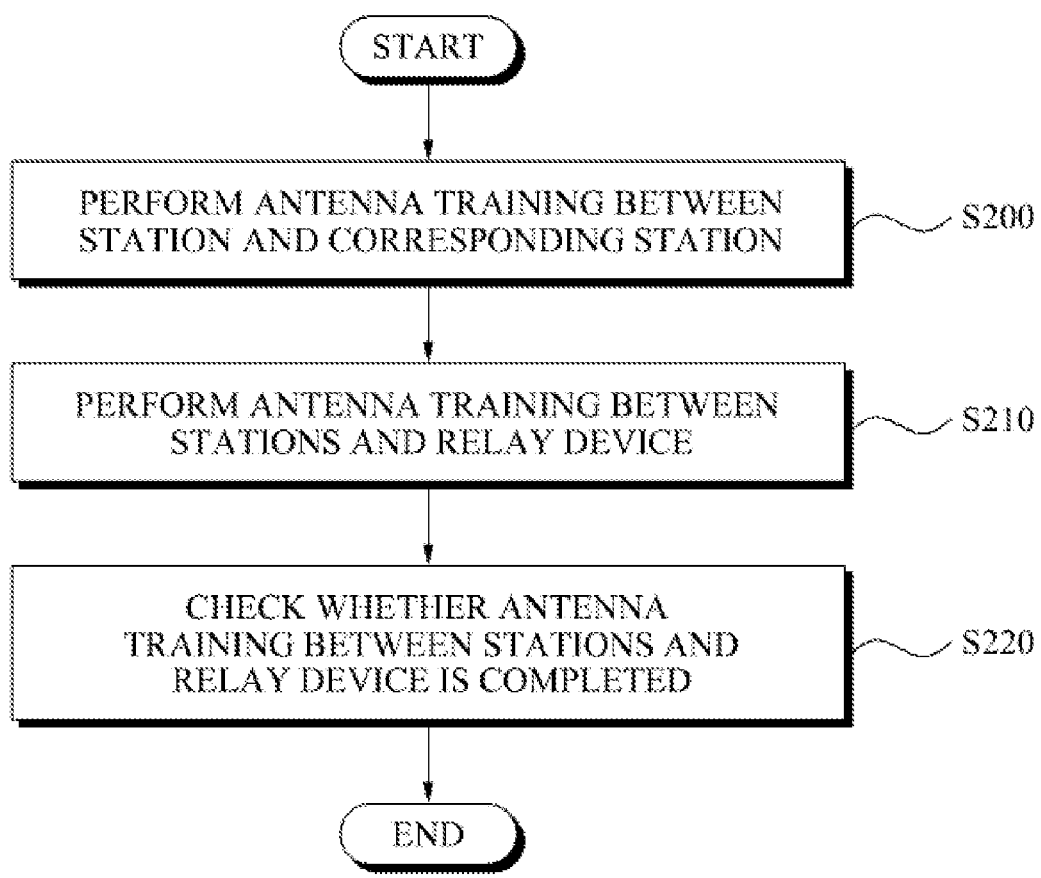
FIG. 10 is a flowchart illustrating an antenna training procedure between the station and the relay device, according to an example embodiment.

FIG. 10 is a flowchart illustrating an antenna training procedure between the station and corresponding station and relay device.

Referring to FIG. 10, first, the station and corresponding station perform antenna training through a direct route in operation S200.

One station from among the station and corresponding station requests the antenna training of the direct route and the stations perform the antenna training. Subsequently, a device that requests the antenna training, for example, a first station, may transmit a relay set request command to a second station (corresponding station) using a Relay IE. Then, the second station may transmit a relay set response command to the first station.

Subsequently, the stations and relay device perform antenna training in operation S210.

When the first station receives the relay set response command from the second station, the first station may request the antenna training with the relay device.

The antenna training between the stations and relay device may include a first antenna training through a first relay route between a first station and relay device and a second relay route through a second relay route between the second station and relay device.

The antenna training between the stations and the relay device may be classified into a sequential training and a parallel training according to a performance order of the first antenna training and the second antenna training.

The sequential training is a method that the first antenna training and the second training with respect to the first relay route and the second relay route are sequentially performed. A device that requests antenna training of the direct route, for example, the first station, performs antenna training with the relay device and then the second station may perform antenna training with the relay device. That is, after the first antenna training is performed, the second antenna training is performed. Also, it is possible to perform the first antenna training after the second antenna training is performed.

The parallel training is a method that the first antenna training and the second antenna training with respect to the first relay route and the second relay route are simultaneously performed. The antenna training between a device that requests the antenna training, for example, the first station, and the relay device is simultaneously performed together with the antenna training between the second station and the relay device. In this instance, the relay device needs two modems since the relay device simultaneously performs antenna training with the station and corresponding station.

Subsequently, whether the antenna training between the stations and the relay device is completed is checked in operation S220.

The first station transmits a relay complete request command to the second station using a Relay IE. Then, the second station transmits a relay complete response command to the first station after the antenna training with the relay device is completed. Through transmitting/receiving a complete command with respect to the antenna training between stations, the antenna training procedure between the stations and relay device is completed.

Hereinafter, a communication route switching method between stations will be described in detail.

For example, a station of the present invention may communicate through an alternative route using a relay device when a direct route between stations is interrupted. In this instance, an alternative route selecting method of the station includes an explicit method that uses relay switch command and an implicit method that uses a time of communication being interrupted without using the relay switch command.

Figure 11:
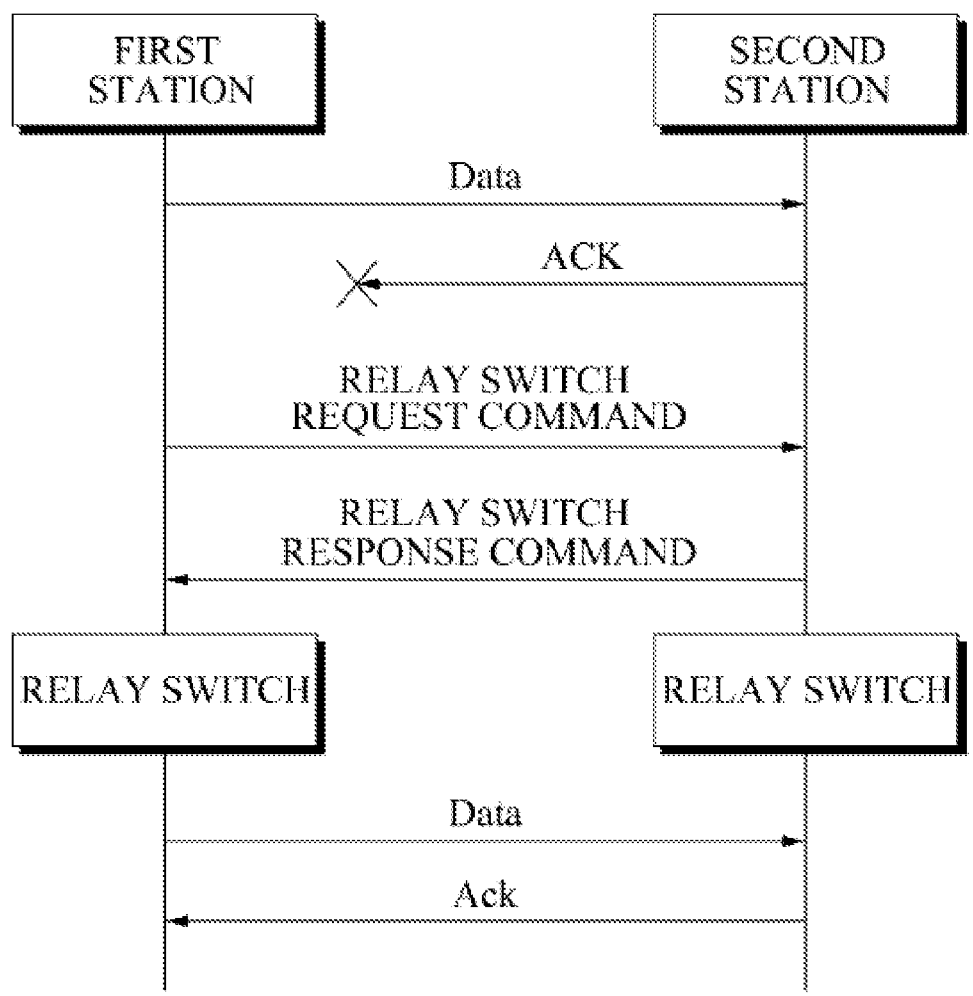
FIG. 11 illustrates an explicit method that selects an alternative route using a relay switch message according to an example embodiment.

FIG. 11 illustrates an explicit method that selects an alternative route using a relay switch message according to an example embodiment.

Referring to FIG. 11, the explicit method is a method that switches a route using a relay switch command between stations. That is, when a device that requests antenna training with a direct route, for example, a first station, transmits data and does not receive more than a certain number of ACKs with respect to the data from a second station, the first station transmits a relay switch request command to the second station through the alternative route. In this instance, the first station may perform transmission in an omni-directional transmission.

When the second station does not receive data from the first station through the direct route, the second station adjusts a beam to a relay device that is recognized as a result of the antenna training. Subsequently, after receiving the relay switch request command, the second station transmits the relay switch response command including detour time IE indicating a point in time when the alternative route will be used to the first station. In this instance, the second station performs relay switching and uses the alternative route through a relay device from the detour time.

The first station receives the relay switch response command and determines a point of the time when the alternative route will be used through the relay device using the detour time IE included in the command. When data communication through the alternative route is unavailable at the determined detour time, the first station may use the direct route again using the relay switch command. The explicit method uses the relay switch, and thereby can reliably select the alternative route and adjust the time when the alternative route will be used.

Figure 12:
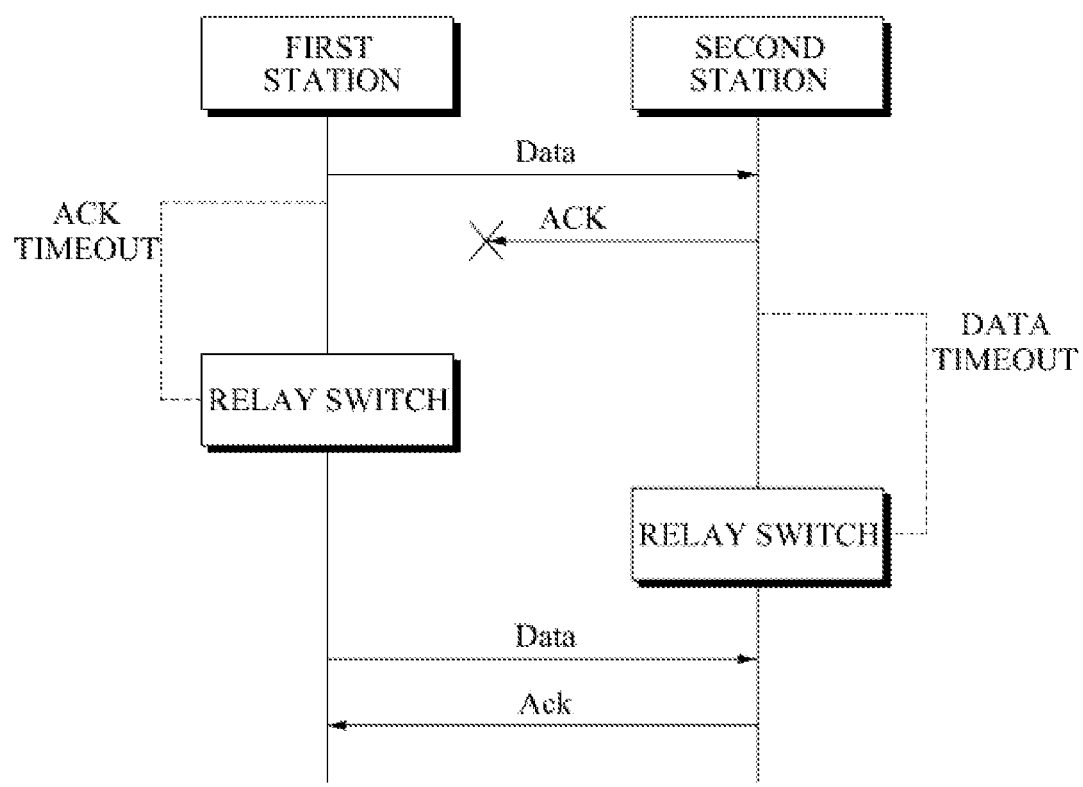
FIG. 12 illustrates an implicit method that selects an alternative route using a time of communication interruption, according to an example embodiment.

FIG. 12 illustrates an implicit method that selects an alternative route using a time of communication interruption, according to an example embodiment.

Referring to FIG. 12, an implicit method is a method that switches a route using a time of disconnection data communication between stations. That is, when a device that request antenna training of a direct route, for example, a first station, transmits data and does not receive more than a certain number of ACKs with respect to the data from a second station, the first station performs relay switching and transmits/receive data using an alternative route through a relay device.

When the second station does not receive data from the first station for a certain time, while periodically receiving data, the second station performs relay switching and immediately transmits/receives the data using the alternative route through the relay device.

However, when, although the first station transmits data using the alternative route through the relay device, the first station does not receive an ACK with respect to the data from the second station, the first station may recheck a selection of the alternative route through the explicit method. Subsequently, when data communication through the alternative route is unavailable, the station uses the direct route again using the relay switch command in the same manner as the explicit method.

Here, a relay switching of the first station may be performed prior to a relay switching of the second station, and the reverse is possible.

The implicit method may switch the communication route more quickly through not using the relay switch command.

According to an example of the present invention, when a station is in a single route mode and a selected communication route is interrupted, a data transceiver may switch the communication route using either the explicit or implicit method.

However, when the station is in a sequential multi-route mode, the station may sequentially use the multi-route and naturally use the implicit method. In this case, the station may not use the relay switch command and may not need station switching and antenna setting with respect to the transceiver of a relay device, thereby reducing time for switching communication route. Therefore, when the station is in the sequential multi-route mode, as a time for switching decreases, delay and loss of data transmission may be effectively improved. Accordingly, the sequential multi-route mode of the station may be more effective when the data is delay sensitive information such as video streaming.

According to an example of the present invention, a data transceiver in the wireless communication system uses multi-route, and thereby can smoothly transmit/receive data even when a route is disconnected. Also, the data transceiver in the wireless communication system uses two routes, and thereby can reduce power consumption of switching. However, a number of routes is not limited thereto, the number of routes may vary as required.

The data transmitting/receiving method in the wireless communication system according to example embodiments may use an alternative route using a relay device in addition to a direct route between stations, and thereby can smoothly perform communication even when the direct route is disconnected. Also, power consumption for switching may be maximumly reduced through effectively using a multi-route.

The data transmitting/receiving method in the wireless communication system according to example embodiments may be recorded in computer-readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of example embodiments.

Although a few example embodiments of the present invention have been shown and described, the present invention is not limited to the described example embodiments. Instead, it would be appreciated by those skilled in the art that changes may be made to these example embodiments without departing from the principles and spirit of the invention, the scope of which is defined by the claims and their equivalents.

The invention claimed is:

1. A method for communicating data between a source station and a destination station, the method comprising:
transmitting, by the source station, data through a direct route to the destination station;
determining, at the source station, whether an Acknowledge (ACK) from the destination station is received during a first predetermined period, and upon detecting that no ACK is received during the first predetermined period, performing first relay switching at the source station and transmitting the data to the destination station via a relay route that uses a relay device; and
determining, at the destination station, whether the data from the source station is received during a second predetermined period, and upon detecting that no data is received during the second predetermined period, immediately performing second relay switching at the destination station and receiving the data via the relay route that uses the relay device, wherein
the second relay switching at the destination station is performed after the first relay switching at the source station.

2. The method of claim 1, further comprising:
verifying availability of the direct route and the relay route; and
switching from the direct route to the relay route, based on a result of the verifying.

3. A non-transitory computer-readable storage medium storing a program comprising instructions to cause a computer to perform the method of claim 1.

4. A system for communicating data, comprising:
a source station for transmitting the data; and
a destination station for receiving the data, wherein
the source station includes a first processor and a transmitter that are configured to
transmit data through a direct route to the destination station, and
determine whether an Acknowledge (ACK) from the destination station is received during a first predetermined period, and upon detecting that no ACK is received during the first predetermined period, perform first relay switching at the source station and transmit the data to the destination station via a relay route that uses a relay device; and the destination station includes a second processor and a receiver that are configured to
receive the data through the direct route from the destination station, and
determine whether the data from the source station is received during a second predetermined period, and upon detecting that no data is received during the second predetermined period, immediately perform second relay switching at the destination station and receive the data via the relay route that uses the relay device,
wherein the second relay switching at the destination station is performed after the first relay switching at the source station.

5. The system of claim 4, wherein the source station is configured to
verify availability of the direct route and the relay route, and
switch from the direct route to the relay route, based on a result of the verifying.

\* \* \* \* \*